2,902,369
Patented Sept. 1, 1959

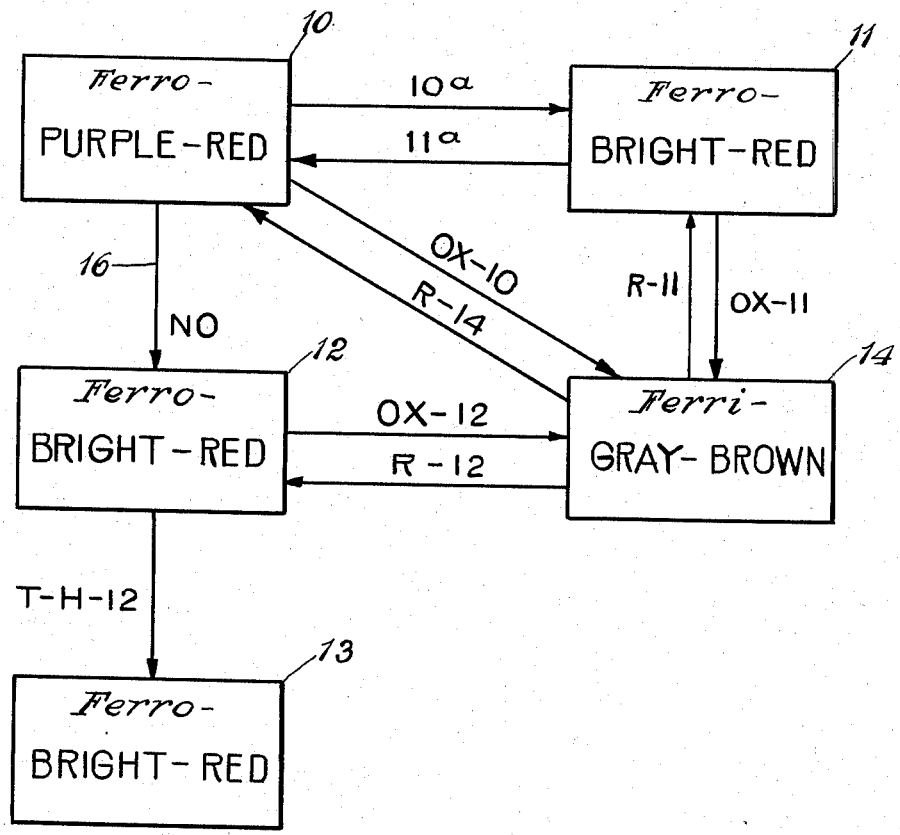

2,902,369

MEAT-CURING PROCESS

Stephan L. Komarik, Chicago, Ill., assignor to The Griffith Laboratories, Inc., Chicago, Ill., a corporation of Illinois Application September 12, 1956, Serial No. 611,808

17 Claims. (Cl. 99—159)

The present invention relates generally to the curing of sliced fresh meat and more particularly to curing pork products, such as bacon from pork bellies and Canadian bacon from pork loins.

Heretofore meat has been cured in large pieces, such as whole hams, pork bellies, and pork loins. Excepting very special cases, the curing has been accomplished in the cold to minimize spoilage. To cure such pieces at room temperature, for example, calls for removing the large pieces from refrigeration and for elevating the temperature thereof. This takes so long that parts of the pieces are non-uniformly tempered and, therefore, spoilage to a degree may take place. Both good and bad results are non-uniform.

Heretofore such curing has been achieved by use of curing salt comprising sodium chloride and either alkali metal nitrate or nitrite, or both. To effect penetration of unsliced meat bodies by the salt mixture, howsoever it is used, an adequate processing time must be provided. The sodium chloride functions not only as a residual condiment for the cured meat, but also to minimize decomposition of the lean during the cure, and to improve the water-binding capacity of the protein. Cold temperatures for the cure likewise minimize spoilage or off-taste.

Present-day merchandising has so changed that currently meat is sliced or cut, and wrapped by the packer in transparent material through which which the piece may be viewed when on display, and, accordingly, it is important that the display face of the meat have the desired stable red color. The merchant is not concerned with the slicing. Heretofore large pieces have been cured and then sliced for merchandising.

The present invention provides new curing methods particularly adapted to modern merchandising, involving slicing and then curing, whereby the curing time may be greatly shortened and the process simplified.

It is the general object of the invention to expedite the curing process for sliced pork products, and thereby to provide improved meat products.

It is a particular object of the invention to slice uncured meat into market-form slices, and then to cure the slices.

It is a particular object to expedite the cure by the use of heat, and thereby to effect the cure in a short time avoiding the use of the conventional low temperatures of cold-curing.

It is also an object of the invention to generate the required temperature within the slice by exposure to heat-generating electromagnetic waves.

It is also an object to generate the heat internally by exposure to infra red heat rays, and to cool the surface of the slices exposed to said rays to minimize or avoid exudation of rendered fat.

Various other and ancillary objects and advantages of the invention will become apparent from the following description and explanation of the invention as it is explained in part by reference to the accompanying drawing, in which color reactions are shown for normal meat and meat being cured.

In the case of smoked meats, it has been the custom to initiate the cure of large unsliced pieces, such as loins or bellies, at low temperatures, in one of the several known ways, and then to bring out the final stable red color while adding smoke flavor by hanging the cured pieces in a smokehouse. This dries the interior and exterior unevenly, and subjects the interior and exterior for different times to different temperatures whereby the qualities, such as moisture content, color and taste, are not uniform. In the particular case where bacon is cured in pickle liquor at 110° F. to 135° F., as described in Komarik No. 2,553,533, the belly is likewise subjected to non-uniform exposure to different temperatures for different times, along with other factors of non-uniformity.

By the present invention, these non-uniformities with respect to the treatment of pork products are greatly reduced or eliminated. The present invention involves color changes in the lean of meat including the effect of nitric oxide, for example, by the use of alkali metal nitrite. The chemistry of meat curing is not fully understood. However, it is well indicated in Lewis No. 2,147,261, which aims to correlate color with chemical identity. In the accompanying drawing, the colors of meat and interrelationships are indicated as they are believed to be, without, however, indicating the chemical compounds, it being understood that they are ferro- and ferri-proteins and are various derivatives of hemoglobin and myoglobin.

Numeral 10 designates raw meat and the purplish red color thereof. Numeral 11 represents raw meat and a bright red color thereof. Color 10 is changed to color 11 by the uptake of oxygen, and the reverse change is effected by the loss of oxygen. The direction of the equilibrium reaction depends upon oxygen pressure, and it is the same type of reaction as the give-and-take of oxygen which is performed by the blood to supply oxygen to a living organism. These reactions are respectively represented by the numerals $10^a$ and $11^a$. The lean of meat to be treated by the present invention may involve the forms 10 and 11.

The color aimed at in curing meat is a well-known red color of curing having suitable stability to maintain itself through the normal time of displaying merchandise for sale. As first formed, it is indicated by the numeral 12 as a bright red of unstable character. Quickly by heating, or by long standing at cooler temperature, the unstable red 12 converts to a more stable bright red 13. The conversion from 12 to 13 is indicated by line T—H—12, signifying that the reaction is faster the higher the temperature, and vice versa.

Numeral 14 represents a gray-brown color which is assumed by raw meat as a result of oxidation, such that ferro-proteins are changed to ferri-proteins. The oxidation reactions to produce color 14 from fresh meat are indicated by the numerals OX–10 and OX–11, and they may be effected in various ways, as by the oxygen of the atmosphere, by the oxidizing effect of bacteria and enzymes, and by chemical agents, the latter being an important reaction when nitrite cures are involved. The use of nitrite salt generates nitric oxide which is highly reactive with atmospheric oxygen to produce nitrogen dioxide. The latter is a strong oxidizing agent yielding nitric oxide for repeating the process. By this mechanism, nitric oxide is a catalyst for oxidation by air. The gray-brown color 14 from raw meat 10 is reducible to the purplish red color 10 by a reduction reaction designated R–14, although it is possible that part of the action from 14 to 10 may take place by way of R–11 to 11 and by $11^a$ to 10. The reduction from 14 to 10 may be effected by the action of reducing bacteria, or reducing enzymes, or by chemical reducing agents. Thus, when an active chemical oxidizing agent is present, the gray-brown color 14 is quickly formed, subject to slower reduction by reducing enzymes or reducing bacteria, or by action of specific reducing agents which may be present. Exposed raw meat may be gray-brown on the outside and purplish red inside.

Curing with nitric oxide first produces the gray-brown which changes to a red color 12. Nitric oxide easily reacts with the raw meat 10 and changes the purplish color to red color 12 by a reaction indicated at 16. The red color 12 is due to nitroso-protein compounds, these being termed nitrosohemoglobin and nitroso-myoglobin, and these are subject to oxidation by reaction OX–12 to form gray-brown color 14. This oxidation is impeded by the presence of reducing agents or by natural enzymes when oxygen contact is limited.

Whereas fresh meat initially takes up oxygen to yield a bright red color 11, the uptake of oxygen in cured products results in an oxidation from the ferro- to the ferri- or gray-brown colored compound 14. It is for this reason that commercially fresh meats are preferably so packaged in cellophane to permit the meats to breathe, whereas cured meats are preferably packaged by vacuum packaging methods, so using films such as Saran or polyethylene as to minimize the entry of air.

It is well known that the initial unstable red color 12 of curing gradually changes to a more stable red color 13, as a time and temperature reaction. The heat of cooking or smoking accelerates the reaction. Long standing in cold pickle liquors effects it. The change involves the protein and authorities attribute the stable red color to nitroso-myochromogen and nitroso-hemochromogen (see Jensen: Microbiology of Meats, third edition, page 56).

The acidity of meat is such that when nitrite salts are used, nitrous acid is liberated. Nitrous acid functions according to the following reactions:

$$2HNO_2 = NO + NO_2 + H_2O$$

Thus, in curing, nitrite salt provides nitric oxide for reaction 16 and simultaneously oxidation reactions on the paths OX–10, OX–11 and OX–12. As a result, the compounds in the meat having gray color 14 may be ferri-proteins and nitrosoferri-proteins. The first noted color change is the rapid appearance of gray-brown resulting from the chemical oxidation available through nitrous acid. Then natural forces of reduction, with or without certain reducing agents which may be used with the nitrite salt, effect reduction reactions which lead to the unstable red color 12, either directly by the path R–12 or indirectly via block 10, or both. After the appearance of the gray-brown color 14 the red color 12 appears whether heated or under refrigeration, the rate being faster the higher the temperature. While this reaction takes place some of the red color 12 already formed converts to the more stable red color 13, which is the eventual final color.

When a nitrite salt is used, it is common practice to use nitrate salt also. Nitrate is gradually reduced to nitrite or nitrous acid by bacteria or enzymes, thus gradually supplying nitric oxide to produce red color 12. It is also a practice to supply with nitrite, or with nitrate, or with both, one or more effective reducing agents. These may be active to reduce oxidized products 11 and 14, but their presence is effective also as a force opposing oxidation forces. Suitable reducing agents are dextrose or other reducing sugars, especially ene-diol compounds, such as ascorbic acid, which may be supplied as a salt of an isomer of ascorbic acid. Experience has shown that when an ascorbic acid is present in a curing salt containing a nitrite salt, the rapidly formed gray-brown color 14 is converted to the red color 12 about twice as fast as when no reducing agent is present.

The present invention aims to accelerate all the reactions to produce the final red color 13, and this may be done as a result of certain discoveries. The progress of curing is visual when using a nitrite salt. The visual effect is the rather speedy appearance of gray-brown, and then its conversion to the final stable red 13. It has been found that the faster the gray-brown is effected, the quicker the final red appears, at a fixed temperature, but quicker the higher the temperature. The following illustrates:

Chilled green pork bellies are pressed and shaped to conventional dimensional slices for marketing. The bellies are then sliced, as in a conventional slicer and, during or after slicing, the two faces are sprayed with a curing solution No. 1 (described below) and promptly placed in a chamber of controlled temperature. At 45° F. the gray-brown color appears in twenty minutes, and faster the higher the temperature. At 180° F. it appears in 1.5 minutes.

In one series of these investigative procedures, the gray-brown-colored slices were retained in the heating chamber at the same temperature to achieve the final red color. At 45° F. this required 16 hours. At 180° F. it required an additional 6 minutes.

In another series, the gray-brown-colored slices when so colored were promptly transferred to a cooler at 45° F. to achieve the final red color. The 45° F. slices required 16 hours. The 180° F. slices required 3.25 hours.

Table I shows the data at these and intervening temperatures.

TABLE I

| Item | Minutes—From Putting in Chamber at T° F. | | Hours—After Transfer to 45° F. from Chamber at Gray-time |
|---|---|---|---|
| | ° F. | To Gray-Brown | To Red | Time to Red |
| 1 | 45 | 20 | (16 hours) | 16 |
| 2 | 80 | 10 | 430 | 7 |
| 3 | 110 | 8 | 128 | 6 |
| 4 | 130 | 4.5 | 94.5 | 5 |
| 5 | 140 | 3.5 | 63.5 | 4.5 |
| 6 | 150 | 2.5 | 25 | 4.0 |
| 7 | 160 | 2.0 | 12 | 3.75 |
| 8 | 180 | 1.5 | 6 | 3.25 |

Temperature has various critical effects on meat. At 137° F. meat begins to cook. This is a conventional minimum processing temperature in preparing meat, which, in the case of pork products, is raised to 138° F. to kill trichina, and to 142° F. as a factor of safety. At temperatures upwardly from 110° F. heat may render one or more components of the fat, to an extent depending on the time, the temperature and the kind of fat.

When fat is rendered on a slice to be merchandized and allowed to cool on the slice, it forms white spots of solid fat as blemishes which impair its sales value. The present invention aims to cure the meat under temperature conditions which normally might render fat, but under imposed conditions substantially to prevent rendering fat at the surface of the slice.

The process in its broadest aspect comprises converting the raw meat mass to display-sized pieces, such as Canadian bacon, and especially slices of pork belly for bacon. Because the process is quick, conditions do not induce rancidity or decomposition, and sodium chloride is not needed except when desired for its condiment value. Likewise, the temperature of the display-sized pieces for applying the curing agent is not important for reasons concerning rancidity or decomposition.

It is preferred that the loins or bellies in their condition to be treated by the present invention be at a keeping temperature a which they may be cut or sliced. In the case of raw pork bellies, and some other pieces, which are shaped while cold by presses before slicing, the temperature is preferably in the range from 20° F. to 28° F.

The first step in the process is the cutting or slicing to form display-sized pieces. The second step is to apply a curing salt solution containing a nitrite salt to one or both surfaces of the slices. Preferably, the nitrite salt is one of sodium, or of potassium or ammonium. The acid character of the meat itself is effective to liberate nitrous acid from a nitrite salt. The additive effects an initial reaction producing the gray-brown color which however, is not stable, being subject to conversion to red. The next step is to raise the temperature of the slice to an internal temperature in the range from 115° to 140° F., while preferably maintaining the displayable face of the slice at a non-rendering temperature for fat, which may be a minimum temperature varying from 110° to 140° F.

When heating is accomplished by exposure to infrared heat rays, such as lamps, from which the heat rays penetrate and heat internally, the surface exposed to the lamps is heated faster than the interior and is therefor cooled by jets of air. The use of air jets for cooling has a function of value commercially, giving preference to such heat rays as the heat-generating electro-magnetic waves. Certain government regulations require a cured weight not over that of the green bellies. The added curing salt solution, used in amount from 3% to 10% of the green weight, calls for loss of water. This is readily effected in the short time of the process by the jets of cooling air over the surface. The evaporation of water aids in the cooling effect.

The process may be varied in many ways. The nitrite salt may be accompanied by one or more of other ingredients commonly used in preparing meat, such as sodium chloride, sodium nitrate, sugars, sodium tripolyphosphate, certain orthophosphate salts, an ascorbic acid or its soluble salt, anti-oxidant, such as nordihydroguairetic acid (NDGA), or butylated hydroxyanisol (BHA), or butylated hydroxytoluene (BHT), spices, and other well-known additives. For red color fixation, the nitrite salt used alone is sufficient.

As is well known, reducing agents are effective in curing, not only to speed the development of red, but to stabilize it after development. The data for Table I was effected in the presence of ascorbic acid. In the absence of ascorbic acid, as in a curing salt solution lacking in it, the red color is slower in developing taking 2 to 4 times as long. Accordingly, the presence of an ascorbic acid as a soluble salt of an isomer of ascorbic acid is preferred to accompany the nitrite salt. Ascorbic acid is an example of equivalent reducing agents which are enediol compounds as described in Hollenbeck No. 2,739,899.

A solution containing the curing nitrite salt may be applied by spraying it on, or by passing the piece through a chamber filled with a mist or fog of the solution. The meat piece may be dipped into, or conveyed through, a bath of the solution. Where flat faces of the meat piece are available, a thin film of the solution, as on a belt or on a transfer roll, may be applied by contact of the film with the flat face.

The heating for cure may be effected in numerous ways. One way is to use an oven. Another way is to use high frequency induction of heat. Another method is to subject the surface to be heated to infra-red heat rays, at a distance from the source, and at a concentration of rays such that the surface layers may be cooled at the same time, as described. By experience with commercial thin-sliced bacon, it has been found that the slices may be arranged in overlapping arrangement to provide a piled sequence of slices varying in thickness from the thickness of one slice to the thickness of three slices, as in the manner currently used in the market to expose the red colored lean. When the slices are not over 3 mm. thick and when both faces of the slices have been treated with curing salt, as described below, the assembled slices can be heated to effect the gray-brown color without rendering fat by exposing them to infra-red lamps and to cooling air at one face, in a period of 10 to 15 minutes when reducing agents are used, or longer otherwise, in attaining a temperature in the range from 115° F. to 125° F. internally, as measured by a thermocouple placed between overlapping slices.

In the present invention, good smoke, of which the active ingredient is pyroligneous acid, may be applied in any of the known ways. In the case of bacon, having in each slice a large area of fat, it is preferred to avoid contact between a fatty surface and a heavy concentration of smoke because there results a yellowish coloration of the normally white fat. For such avoidance, it is practicable to subject the whole piece to be sliced, that is the green belly in the case of bacon, to smoke as in a smokehouse. The smoke is thus concentrated only on the surface, which become edges in the slices, and from such surface smoke flavor diffuses inwardly into the body at a dilution to avoid such coloration of fat. When the belly is smoked before removing the skin, the skin may or may not be removed before slicing, and, when not removed, it is a reservoir of smoke aroma. However, a preferred way is to run the slices on the treating conveyer through a chamber, quickly, and to the desired controlled extent precipitate smoke onto the slices, by well-known electrical methods.

*Example 1*

In carrying out the process commercially for bacon, green bellies, previously smoked or not, are pressed at a temperature in the range from 20° F. to 28° F., and preferably at 24° F., to desired rectangular shape for packaging and run through a slicing zone. Any commercial slicer is suitable. The curing solution is preferably applied in the slicing zone so that the fast falling slices may pile up in the conventional overlapping arrangement on a conveyer.

A spray nozzle is arranged continuously to discharge a mist or fog of curing solution No. 2 in total amount to apply 5 parts of solution per 100 parts of belly. Preferably it is directed onto the end of a belly about to be sliced and upon the last-cut face of a slice just formed. Suitable housings, baffles and collectors may be placed to confine mist and collect surplus liquid.

The slices may vary in thickness up to ¼ inch, and specifically are not more than ⅛ inch thick when in overlapping arrangement of not over three thicknesses; and they are so arranged that the lean portion of each slice is exhibited.

The slices in overlapping relation are then conveyed through a heating zone, preferably for developing heat internally. This may be done with a bank of infra-red lamps each placed about 9 to 15 inches from exposed faces. The time of exposure is such as to generate an internal temperature of about 115° F. to 125° F. in about 10 to 15 minutes, the temperature being limited to avoid frying. Suitable lamps are those operating at 125 volts and 250 watts, and having red filters to filter out actinic rays, such as some ultra-violet, and to pass easily the heat rays. Other sources of infra red rays without attendant light may be used.

The surface so heated tends to become hotter than the interior and would rise well above 140° F. during the heating period unless such rise is inhibited. By blowing a current of air of a controlled temperature, either chilled or at room temperature, across the stacked slices at a suitable velocity, such as 400 to 800 feet per minute for room-temperature air, the surface is maintained at a temperature substantially non-rendering of fat in a range from 110° F. to 140° F. Water is evaporated to assist in the cooling.

Although the gray color appears in 4 to 5 minutes, it changes to a red in about 8 to 10 minutes from the start of heating, and during an entire heating period of 10 to 15 minutes for attaining the internal temperature of 115° F. to 125° F., the initial red is converted to the stable red of nitroso-myochromogen and nitroso-hemochromogen. The slices then move into and out of a smoke precipitator wherein smoke is electrically deposited on the slices in a passage of about 1 minute. Then the slices are removed to a chill atmosphere of about 10° to 30° F., wherein static air of 10° F. chills them in about 20 minutes. Static air of higher temperature requires a longer time, which may be shortened by blasting the chilled air onto the slices, preferably by passing the slices on a conveyer through such an air current.

The slices are then wrapped in the conventional transparent wrapper in the same overlapping relation exposing the lean, and on a cardboard backing, and placed in a storage cooler at a temperature not over 50° F. The so-packaged bacon is suitably colored and stable to display for sale.

Suitable solutions for spraying the bellies are as follows:

Curing solution No. 1:
  Water _____gallons__ 10
  Sodium chloride _____lbs__ 27.7
  Sodium nitrite _____lb__ .111
  Sodium nitrate _____lb__ .073
  Cane sugar _____lbs__ 3.14
  Sodium ascorbate _____ozs__ 30.0

Curing solution No. 2:
  Water _____gallons__ 10
  Sodium chloride _____lbs__ 25.7
  Sodium nitrite _____lb__ .30
  Sodium nitrate _____lb__ .20
  Cane sugar _____lbs__ 6.25
  Sodium ascorbate _____ozs__ 12.75

Curing solution No. 3: This is solution No. 2 without the sodium ascorbate.

*Example 2*

Chilled pork bellies sliced to ⅛-inch thickness were sprayed with 5% by weight of curing solution No. 3 (without sodium ascorbate) and passed under the infra red lamps. In 25 minutes the internal temperature was raised to 135° F. with development of red color. No surface cooling was practiced, so that some fat rendering was evident. The bacon was unfried at 135° F. The resulting product was promptly chilled without smoking, and as chilled was ready for packaging.

*Example 3 (Canadian bacon)*

Chilled pork loin was sliced to 3/16-inch thickness and piled on a conveyer in overlapping relation of two thicknesses, being first sprayed on both sides with curing solution No. 2. An internal temperature of 138° F. was attained under the infra red lamps in 22 minutes with the lamps 12 inches from the meat. Because of the substantial absence of fat, no surface cooling was practiced.

When the same lamps are 9.5 inches from the meat, an internal temperature of 139° F. was obtained in 15 minutes and at 6.5 inches, 138° F. was attained in 10 minutes.

The stable red-colored products are merely chilled and then packaged.

*Example 4*

Chilled pork loin is sliced to 3/16-inch thickness, and sprayed on both faces with about 5% by weight of curing solution No. 2 and then exposed to the heated atmosphere of an oven at 180° F. In 17 minutes the internal temperature of the slice was raised to 138° F., and the red nitrite-cured color was fully developed. The products was then chilled and packaged.

In the treatments above described, an amount of any of the curing solutions in the range from 3 to 10 parts of solution to 100 lbs. of meat may be used. This is sufficient to color the lean throughout. When a less amount is used and the initial heat-curing reaction promptly initiated, the color-change to develop graybrown and then red, may be more limited to the surface layer.

Although the invention is more particularly useful in the field of bacon, as described, the reactions are the same with other meats, and the invention broadly contemplates that the process may be applied to meat other than pork.

From the foregoing description and explanation, it will be apparent that the invention may be practiced in numerous ways in modification of the illustrative methods above given, without departing from the spirit and scope of the invention as expressed in the appended claims.

I claim:

1. The method of curing pork bellies and loins for bacon slices which comprises cutting fresh whole pork pieces to provide slices, wetting at least one surface of each slice with a nitrite-containing curing salt solution, developing the stable red color of nitrite-curing by exposing surfaces of the slices to the action of heat capable of rendering fat from the slices at temperatures above 140° F. and by continuing said action until the entire mass of the slices attains temperatures in the range from 115° F. to 140° F. and by cooling the exposed surfaces to maintain the temperature thereof at not over 140° F., and promptly chilling the slices preparatory to packaging.

2. The process of claim 1 in which the pork pieces are subjected to smoke before slicing.

3. The process of claim 1 in which smoke is applied to the slices before chilling.

4. The method of curing pork bellies and loins for bacon slices which comprises cutting fresh whole pork pieces to provide slices, wetting at least one surface of each slice with nitrite-containing curing salt solution, developing the stable red color of nitrite-curing by exposing surfaces of the slices to the action of heat capable of rendering fat from the slices at temperatures above 140° F. and by continuing said action until the entire mass of the slices attains temperatures in the range from 115° F. to 140° F. and by cooling the exposed surfaces to maintain the temperature thereof at not over 140° F., said heating being effected by subjecting the slices to the effect of heat-generating electromagnetic waves, and promptly chilling the slices preparatory to packaging.

5. The process of claim 4 in which the pork bellies are subjected to smoke before slicing.

6. The process of claim 4 in which the slices are in part at least exposed to the atmosphere, and in which the rendering of fat at the exposed surfaces of the slices is minimized by maintaining said surfaces at temperatures in the range from 115° F. to 140° F. by exposing said surfaces to a cooling environment of air.

7. The process of claim 6 in which cooling air is blown over the exposed slices.

8. The process of claim 4 in which smoke is applied to the slices before chilling.

9. The method of curing pork bellies and loins for bacon slices which comprises cutting fresh whole pork pieces to provide slices, wetting at least one surface of each slice with a nitrite-containing curing salt solution, developing the stable red color of nitrite-curing by exposing surfaces of the slices to the action of heat capable of rendering fat from the slices at temperatures above 140° F. and by continuing said action until the entire mass of the slices attains temperatures in the range from 115° F. to 140° F. and by cooling the exposed surfaces to maintain the temperature thereof at not over 140° F., said heating being effected by subjecting the slices in a cooling environment of air to a source of infra red heat rays whereby to generate the heat internally, and promptly chilling the slices preparatory to packaging.

10. The process of claim 9 in which the cooling environment of air is effected by blowing cooling air over the slices.

11. The process of claim 10 in which the temperature of the exposed surfaces is maintained in the range from 115° F. to 140° F. by said cooling air.

12. The process of claim 9 in which the pork pieces are subjected to smoke before slicing.

13. The process of claim 9 in which smoke is applied to the slices prior to chilling.

14. The process which comprises cutting chilled fresh meat to thin edible slices, applying nitrite-containing curing salt solution, developing the stable red color of nitrite-curing by exposing surfaces of the slices to the action of heat capable of rendering fat from the slices at temperatures above 140° F. and by continuing said action until the entire mass of the slices attains temperatures in the range from 115° F. to 140° F. and by cooling the exposed surfaces to maintain the temperature thereof at not over 140° F., and promptly chilling the slices.

15. The process of claim 14 in which the heat is generated within the slices.

16. The process of claim 14 in which the heat is generated within the slices by exposure to infra red heat rays, and in which the surfaces of the slices exposed to said rays are cooled by exposure to cooling air.

17. The method of curing pork bellies for bacon slices which comprises cutting fresh bellies to provide slices wetting at least one surface of each slice with a nitrite-containing curing salt solution, developing the stable red color of nitrite-curing by exposing surfaces of the slices to the action of heat capable of rendering fat from the slices at temperatures above 140° F. and by continuing said action until the coolest portions of the heating slices attain temperatures in the range from 115° F. to 125° F., said heating being effected by exposing the slices to a source of infra red heat rays whereby to generate the heat internally, and by cooling the surfaces of the slices exposed to said source by passing a cooling current of air over the surface, the cooling of the surface being such as to maintain the surface temperature not over 140° F. whereby to minimize the exudation of rendered fat, and promptly chilling and packaging the slices preparatory to packaging.

References Cited in the file of this patent

UNITED STATES PATENTS

| | | |
|---|---|---|
| 2,461,291 | McKee | Feb. 8, 1949 |
| 2,528,204 | Zwosta | Oct. 31, 1950 |
| 2,553,533 | Komarik et al. | May 15, 1951 |
| 2,627,473 | Brissey | Feb. 3, 1953 |
| 2,739,899 | Hollenbeck | Mar. 27, 1956 |

OTHER REFERENCES

"Encyclopedia of Chemical Technology," vol. 8, 1952, pp. 829 to 833, article entitled Curing of Meats.